United States Patent
Eranosian

[11] 3,669,409
[45] June 13, 1972

[54] VEHICLE ATTITUDE STABILIZATION AND CONTROL SYSTEM

[72] Inventor: John Eranosian, 175 Phillips Road, Woodside, Calif. 94062

[22] Filed: Dec. 14, 1970

[21] Appl. No.: 97,774

[52] U.S. Cl. .................... 254/45, 200/61.48, 254/86 H, 254/122, 214/515
[51] Int. Cl. ............... B66f 7/26, B60s 9/02, B66f 3/22
[58] Field of Search ........... 254/86 H, 93 R, 93 L, 45, 122, 254/89 H; 214/515

[56] References Cited

UNITED STATES PATENTS

| | | |
|---|---|---|
| 2,029,179 | 1/1936 | Marlowe ...................... 254/122 |
| 2,097,032 | 10/1937 | Marlowe ...................... 254/122 X |
| 2,132,343 | 10/1938 | Jarrett ........................... 254/122 |
| 2,229,530 | 1/1941 | South ............................. 254/86 H |
| 3,289,868 | 12/1966 | Miller et al. ................... 254/45 X |
| 3,350,063 | 10/1967 | Thurlow, Sr. et al. ......... 254/86 H X |

Primary Examiner—Othell M. Simpson
Attorney—Mellin, Moore & Weissenberger

[57] ABSTRACT

A system for stabilizing and controlling the attitude of a vehicle with respect to the underlying terrain when stationary by means of double acting jacks including means for pressure equalization therebetween is disclosed. Electrical control circuitry providing means for fully automatic leveling including a novel pendulum actuated electrical switch is described. Novel jack means particularly adapted for use in the system and preferred electrical control circuitry are disclosed.

8 Claims, 10 Drawing Figures

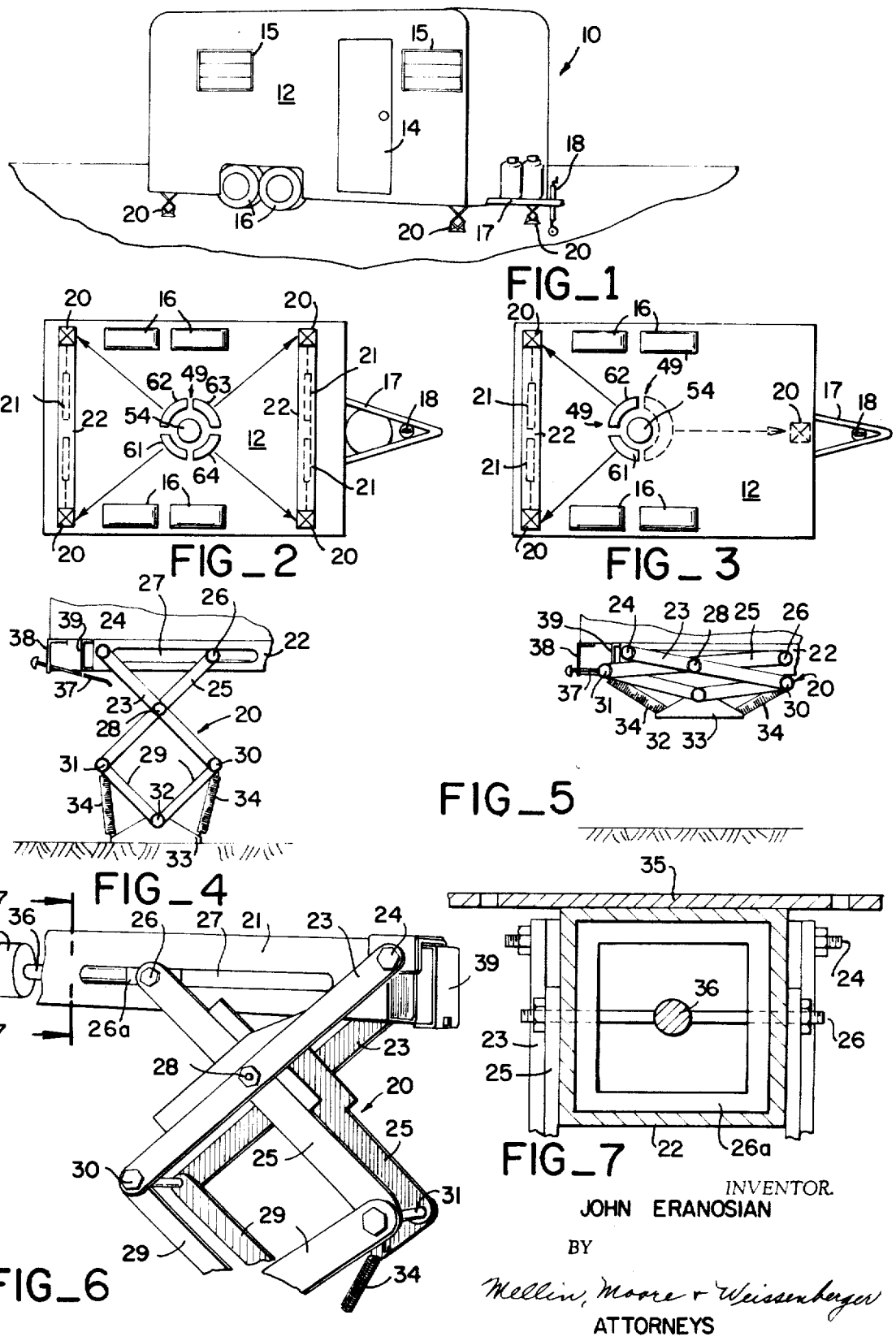

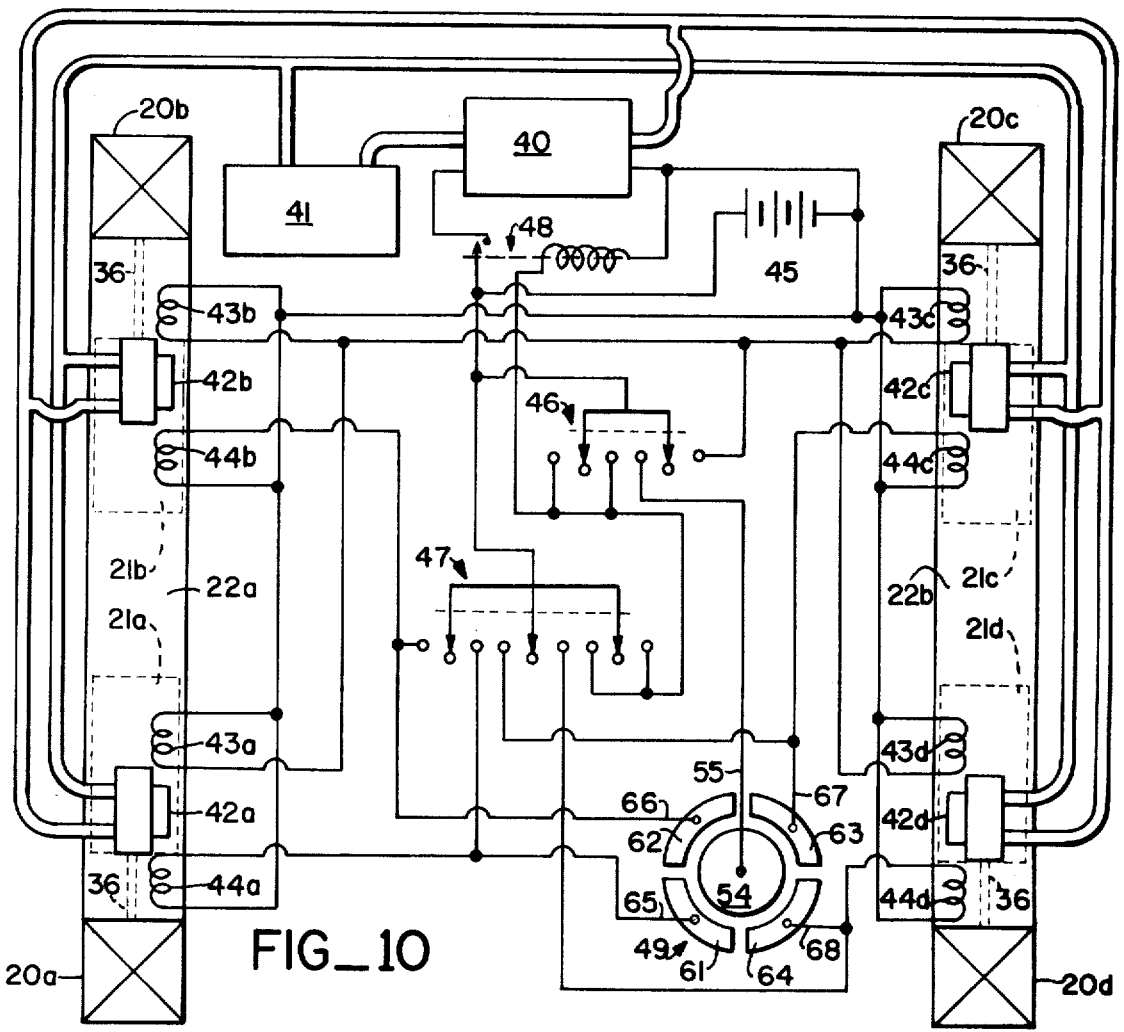
FIG_10
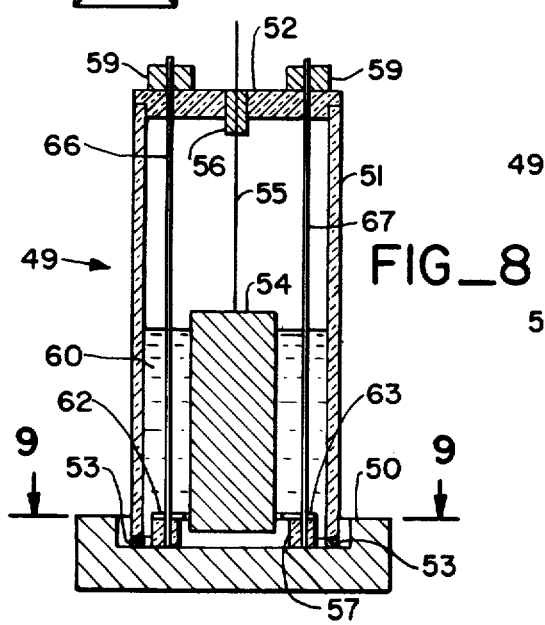
FIG_8
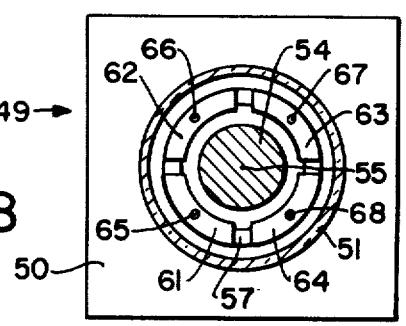
FIG_9
INVENTOR.
JOHN ERANOSIAN
BY
Mellin, Moore & Weissenberger
ATTORNEYS

VEHICLE ATTITUDE STABILIZATION AND CONTROL SYSTEM

BACKGROUND OF THE INVENTION

This invention relates to the stabilization and control of the attitude of vehicles when stationary with respect to the underlying terrain and more particularly to a system including double acting jacks adapted to extend between the underside of such vehicles and such terrain under the control of electrical circuitry including an automatic leveling means.

It is common practice to stabilize vehicles such as trailers and campers when stationary with respect to the underlying terrain by means of adjustable jacks, usually located at corners of the vehicle, in order to avoid unpleasant swaying and jiggling of the vehicle when used as living quarters. Such jacks may also be used to control the attitude of the vehicle with respect to the underlying terrain in order to level the vehicle on uneven terrain or raise a portion of the vehicle with respect to the terrain for maintenance purposes. In general, such jacks have been individually and manually operated to obtain the desired attitude and stability, and often they are separate from the vehicle, thus requiring manual placement between the vehicle and the underlying terrain.

It is known in the prior art to provide systems for the attitude control of vehicles with respect to the underlying terrain when stationary that are integral with the vehicle and power operated under remote control. However, such systems have not been suitable for use with already existing vehicles, but instead have required design changes and the sacrifice of usable space in the vehicle to accommodate the system.

It is an object of this invention to provide a system for the attitude control and stabilization of vehicles with respect to the underlying terrain when stationary that is power operated under remote control and may be mounted on existing vehicles with minimum modification in or sacrifice of the usable space in the vehicle.

It is known in the prior art to utilize gravity responsive means such as a pendulum or mercury switch to provide automatic leveling of the vehicle by remote control of the system. U.S. Pat. No. 2,510,610 to Twist and U.S. Pat. No. 3,164,275 to Schatzl et al. are representative of such prior art systems, for example. However, such systems have accomplished automatic leveling at the expense of stabilization since the gravity responsive means thereof merely selects and actuates the jack or jacks corresponding to the lowest portion of the vehicle, leaving the jack or jacks corresponding to the highest portion of the vehicle out of contact with the underlying terrain. It will be understood that the jacks of the system must be reliably retracted sufficiently to avoid any contact whatever with the underlying terrain while the vehicle is in motion. Thus, when the vehicle is stationary it is necessary to lower the jacks into contact with the terrain before any leveling or stabilization may be accomplished. If all of the jacks are lowered simultaneously and equally, it may be possible to stabilize the vehicle on even terrain but no leveling can be accomplished, and if the terrain is uneven it will also be impossible to accomplish any stabilization.

If the system is adapted to automatically lower only the jack or jacks corresponding to the lowest portion of the vehicle, as in the prior art, it may be possible to level the vehicle, but the vehicle will not be stabilized since the system will not lower one or more of the jacks of the system into contact with the terrain.

U.S. Pat. No. 3,431,727 to Grumman is representative of a semi-automatic system known in the prior art which is capable of achieving both stabilization and leveling by manipulation of controls. However, according to the teaching of this patent, manual control is required to first level the vehicle along one of the axes thereof and then level the vehicle along the other of the axes thereof.

It is a further object of the invention to provide a system capable of fully automatic leveling of a vehicle when stationary and at the same time stabilizing such vehicle in its level position.

It is another object of this invention to provide an electrical control for use in a fully automatic leveling and stabilization system, which control may be mounted at any desired point on the vehicle and adjusted to actuate any one jack of the system individually, and any two adjacent jacks of the system simultaneously, in order to provide fully automatic leveling of the vehicle.

SUMMARY OF THE INVENTION

Briefly, the system of this invention for leveling and stabilizing a vehicle having a longitudinal axis and a transverse axis comprises a source of pressurized fluid mounted on the vehicle, a first hydraulic jack means mounted on the vehicle and adapted to be lowered into contact with the underlying terrain connected to said source of pressurized fluid through a first electrically actuated, four-way valve and a second hydraulic jack means mounted on the vehicle and adapted to be lowered into contact with the underlying terrain connected to said source of pressurized fluid through a second electrically actuated four-way valve, the first and second hydraulic jack means being mounted on a line parallel to one axis of the vehicle and on opposite sides of the other axis of the vehicle. The system includes electrical control circuitry comprising first normally open manual switch means for simultaneously actuating both four-way valves to lower both jack means, second normally open manual switch means for simultaneously actuating both four-way valves to raise both jack means, automatic means for actuating each four-way valve individually and both four-way valves simultaneously to lower the jack means, and normally open switch means for actuating said automatic means. The automatic means preferably includes an electrical switch comprising a pendulum member having an external circular electrical contact surface thereon centrally suspended in the plane of a pair of spaced coplanar electrical contacts insulated from each other and each having a concave surface adjacent the pendulum defining equal portions of a 180° arc of a circle concentric with and having slightly larger diameter than the diameter of the circular electrical contact surface of said pendulum member, the switch being oriented such that the diameter of the circle through the ends of the 180° arc is parallel to one axis of the vehicle, the space between the coplanar contacts is centered on a radius of the circle which is parallel to the other axis of the vehicle and the plane of the co-planar electrical contacts is parallel with the plane of the floor of the vehicle. The preferred embodiment includes four jack means, one located at each corner of the vehicle with the first manual switch control means adapted to simultaneously lower the pair of jack means on one side of the longitudinal axis of the vehicle independently of the pair of jack means on the other side of the longitudinal axis of the vehicle and the second manual switch control means adapted to raise all of the jack means simultaneously.

DESCRIPTION OF THE DRAWING

The foregoing and other objects and features of the subject invention will be more fully understood from the following detailed description when read in conjunction with the drawing wherein:

FIG. 1 is a perspective view of a trailer type vehicle on which the system of the invention may be used with advantage;

FIG. 2 is a plan view of the vehicle of FIG. 1 with elements of one embodiment of the system of this invention indicated schematically;

FIG. 3 is a plan view of the vehicle of FIG. 1 with the elements of another embodiment of the system of this invention indicated schematically;

FIG. 4 is a fragmentary view in elevation showing a preferred jack means for use in the system of this invention in a lowered position;

FIG. 5 is a fragmentary view in elevation of the jack means of FIG. 4 in the raised and locked position;

FIG. 6 is an enlarged fragmentary view in perspective showing structural details of the preferred jack means for use in the system of this invention;

FIG. 7 is an enlarged cross-sectional view taken along line 7—7 of FIG. 6;

FIG. 8 is a cross-sectional view of the pendulum actuated electrical control means preferred for use in the system of this invention;

FIG. 9 is a cross-sectional view taken along lines 9—9 of FIG. 8; and

FIG. 10 is a schematic representation of the electrical and hydraulic circuitry of the system in accordance with the preferred embodiment of this invention.

DETAILED DESCRIPTION

It will be understood that this invention may be used in connection with any type of vehicle in order to stabilize and control the attitude of such vehicle with respect to the underlying terrain when stationary. By definition, a vehicle is adapted to move, and such movement normally occurs in a direction parallel to one of the axes of the vehicle except when turning. The axis along which the vehicle moves will be referred to as the longitudinal axis of the vehicle hereinafter, and the axis of the vehicle perpendicular to the longitudinal axis in the plane thereof will be referred to as the transverse axis of the vehicle. It will be understood that the system of this invention is utilized only when the vehicle is stationary, and thus when the vehicle is in motion all elements of the system are retracted and securely rendered inoperative.

Referring to FIG. 1, a vehicle in connection with which the system of this invention may be used with particular advantage is shown in perspective. The vehicle shown is a house trailer 10 comprising a living compartment or body 12 having a floor, walls and roof and provided with a door 14 and windows 15 as appropriate. The body 12 is mounted for movement on its longitudinal axis by means of wheels 16 journaled at the ends of axles extending parallel to the transverse axis of the body 12. As shown in FIGS. 1-3, a pair of wheels is mounted on each side of the longitudinal axis of the body 12. However, many house trailers utilize a single wheel on each side of the longitudinal axis where the weight of the house trailer 10 is low, and it is of course possible to utilize a single wheel located on a longitudinal axis of the trailer. Furthermore, it will be understood that the system of this invention is applicable to a body similar to the body 12 but adapted to be carried on the bed of a truck such as the well-known camper bodies which are widely used with pick-up trucks, for example.

It will be understood that the body 12 is mounted on the wheels 16 through an appropriate spring means to reduce the effect of bumps and jolts (incurred while moving) on the contents of the body 12. The body 12, as shown in FIG. 1, is provided with a tongue 17 by means of which it is connected to the towing vehicle. When disconnected from the towing vehicle, it is customary to support the tongue 17 with respect to the underlying terrain by means of a manually operated jack, as indicated at 18, which jack 18 is usually provided with a wheel for contacting the terrain in order to enable the body to be moved when disconnected from the towing vehicle. It is of course possible to level the longitudinal axis of the body 12 by appropriate manual adjustment of the jack 18. However, the springs by which the body 12 is mounted on the wheels 16 cause such leveling to be unstable at best. In addition, such springs enable the body to sway and jiggle in response to any change in the distribution of weight within the body, and in fact even wind blowing against the exterior can cause unpleasant swaying due to the resilience of the springs. Furthermore, the attitude of the transverse axis of the body is established by the underlying terrain upon which the wheels 16 rest.

As shown in FIG. 1-3, the body 12 may be both stabilized and leveled by means of a plurality of jacks 20 extending between the bottom of the body 12 and the underlying terrain. For example, four jacks 20 may be utilized, as shown in FIGS. 1 and 2, one at each of the respective corners of the body 12. By proper adjustment of such jacks 20 with respect to each other, both the longitudinal and transverse axes of the body 12 may be leveled, and in addition the weight of the body may be taken off the springs by which the body is mounted on the wheels 16 to thereby stabilize the body 12 in its level position. However, it will be understood that leveling and stabilization of the body 12 might be accomplished through the use of only two jacks located on opposite sides of the longitudinal axis of the body and both being on the opposite side of the axle (by which the body is mounted on the wheels 16) from the tongue 17 (by which the body is towed), as shown in solid lines in FIG. 3. Successful leveling and stabilization of the body 12 would require that the jack means 18 associated with the tongue 17 be manually adjusted to raise the tongue end of the body 12 above the other end of the body 12 so that when the jacks 20 are subsequently adjusted to provide leveling of the longitudinal and transverse axes of the body 12, the weight thereof would be removed from the wheels 16 and distributed evenly among the jacks 18 and the jacks 20. All of the above has heretofore been accomplished in the prior art through the use of jacks which are structurally independent of the body 12 and which have been manually placed between the body 12 and the underlying terrain and manually adjusted in order to obtain the desired stabilization and leveling. Similarly, jack means capable of accomplishing the above ends have been built into bodies such as trailer body 12 at the sacrifice of usable space within the body 12. However, a reliable jack unit capable of being easily and permanently installed on a wide variety of trailer bodies has not previously been available.

According to applicant's invention, a jack unit is provided comprising a pair of scissors jacks 20 each operated by a different double-acting hydraulic ram 21 and mounted at opposite ends of a tubular beam 22 of heavy-gauge metal. As best shown in FIGS. 4, 5, and 6, each scissors jack comprises a first pair of lever arms 23 pivoted at one of their ends about a pin 24 extending through the end of the tubular metallic beam 22. A second pair of lever arms 25 are pivoted about a pin 26, which is slidably received in a pair of slots 27 in opposite sides of the tubular metallic beam 22. Corresponding lever arms 23-25 of the pairs of lever arms are pivotally connected to each other intermediate their ends by means of a pin 28 which passes through both pairs of lever arms. Thus, when the pin 26 is caused to slide within the slot 27 toward the pin 24, the lever arms 23-25 of respective pairs pivot about the pins 24, 26, and 28 so that the ends thereof move away from the beam 22 in the manner well known in the art. As shown in the figures, two further pairs of lever arms 29 pivoted in the free ends of the pairs of lever arms 23-25 by means of pins 30 and 31 and having their free ends pivoted about a common pin 32 are provided. A foot or bearing member 33 is also pivoted about the pin 32, and springs 34 are connected between opposite sides of the foot 33 and the pins 30 and 31, respectively, to insure that the foot 33 always presents its bearing surface in proper orientation to effectively engage the underlying terrain. It will be understood that the scissors jack 20 may include additional stages of lever arms in order to increase the length by which the jack 20 may be extended. Similarly, more lever arms might be used in achieving a given amount of extension in order to reduce the length of such lever arms and provide greater structural rigidity.

As shown in FIG. 7, the tubular metallic beam 22 may be square in cross-section and may be affixed to the underside of the floor of the body 12 by any suitable means such as, for example, by straps 35 welded thereto. Since the beam 22 is a rigid member, the straps 35 may be bolted to spaced frame members or the underside of the body 12. The beam length and strap spacing may be adjusted to suit the particular body 12 involved. Thus, it will be seen that the jack unit of the system in accordance with the teaching of this invention may be easily and quickly mounted on existing bodies without sacrifice of usable space above the floor of the body 12.

As also shown in FIG. 7, the double-acting rams 21 which operate the jacks 20 are contained within the tubular metallic beam member 22. It will be understood that the cylinder of the ram 21 is firmly fastened to the tubular beam member by any appropriate means (not shown) and that the piston rod 36 of the hydraulic ram extends along the longitudinal axis of the tubular beam 22 into operative connection with the pin 26 of the scissors jack 20. Thus, the extension and retraction of the piston rod 36 of the hydraulic ram 21 forces the pin 26 to slide within the slots 27 toward and away from the pin 24, thereby extending and retracting the jack 20. To avoid wear on the pin 26 and slots 27 in use, the pin 26 is supported by a rectangular sleeve 26a slidably received within the beam member 22.

As best shown in FIG. 5, the scissors jack 20 may be firmly and reliably held in its fully retracted position by means of a rod 37 adapted to extend through apertures in spaced bracket members 38, 39 and under the pin 31 when the jack 20 is in its fully retracted position. Thus, the jack 20 will be prevented from extending into contact with the underlying terrain should the hydraulic pressure in the ram 21 associated therewith decrease while the vehicle is in motion. It is of course necessary to remove the rod 37 prior to actuating the ram 21 to drive the jack 20 into contact with the ground in order to avoid damage to the rod 37. When the vehicle is stationary and the jack 20 is in engagement with the underlying terrain, the rod 37 may be allowed to hang loosely in bracket 38 so as to be readily available for manual insertion under the pin 31 and in the apertures of the brackets 38, 39 when the jack 20 is retracted for movement of the vehicle.

As indicated in FIG. 10, all of the hydraulic rams 21 utilized in the system are connected to a common source of pressurized fluid, as indicated by fluid pump 40 and reservoir 41 arrangement. Each of the rams 21 is coupled to the pump 40 and reservoir 41 through a different four-way hydraulic valve 42. Four-way hydraulic valves of many types are well known in the prior art. Such valves include appropriate fluid passageways and mechanical valving elements whereby the pressurized fluid from the pump 40 may be connected to either side of the piston of the hydraulic ram 21, with the other side of the piston of the hydraulic ram 21 being connected to the reservoir 41. In its normal position, the four-way valve, of course, seals both sides of the piston from each other and from the pump and reservoir, thereby enabling the piston of the hydraulic ram to be maintained in a selected position. The utilization of hydraulic rams to drive the jacks 20 from a common source of pressurized fluid, in accordance with the teaching of this invention, is particularly advantageous since such a system is inherently self-equalizing in terms of the force exerted by each of the jacks 20 on the underlying terrain. Such self-equalizing characteristic is an essential feature of a system in accordance with the teaching of this invention because it insures that all of the jacks 20 will be in contact with the underlying terrain and exerting equal force before the automatic leveling of the vehicle is commenced.

It will be understood that if any two jacks 20 of a system in accordance with this invention are simultaneously lowered into contact with the underlying terrain and such underlying terrain is uneven, the downward motion of the first of such jacks 20 to engage the underlying terrain will cease upon engagement until the other jack means has also engaged the underlying terrain. This is due to the fact that any force developed by the first jack means 20 upon engagement with the underlying terrain will be immediately transferred to the second jack means through the hydraulic system. When both jack means are in engagement with the underlying terrain, the force due to the pressurized fluid will be evenly distributed between them so that the vehicle can be raised with respect to the underlying terrain. The force equalization among the various jacks, when operated simultaneously, is an important aspect of applicant's invention. It will be understood that other means of actuating the jacks, such as reversible motors, cannot be used in place of the double-acting hydraulic rams in the system of applicant's invention unless an appropriate means is included in the system for equalizing the forces generated by the jack means upon initial engagement with the underlying terrain.

It will be understood that, according to the teaching of this invention, each of the hydraulic rams 21 may be actuated independently of the others. The four-way valves 42 are normally closed so that a particular ram will not be connected to the source of pressurized fluid and reservoir unless the four-way valve associated therewith is actuated. Thus, it is possible to exert unequal forces among the various jacks 20 of the system in order to accomplish leveling of the vehicle. According to the teaching of this invention, it is also possible to subsequently equalize the forces among the various jacks of the system without destroying the leveling which has been previously accomplished.

According to the preferred embodiment of this invention, the four-way valves 42 of the system are solenoid-actuated, thus enabling electrical control of the system. The electrical control of the system is particularly desirable in connection with the automatic leveling feature of the subject application, since it enables the physical location of the various mechanical elements of the system at any point on the vehicle body as convenient or desired. Thus, the four-way valves 42 need not be physically located adjacent the respective rams 21, as suggested by the schematic representation of the system shown in FIG. 10. Instead, the four-way valves may all be physically located in close proximity to the pump 40 and reservoir 41, for example, and appropriate hydraulic lines and electrical wires interconnecting the elements of the system may be mounted on or under the floor of the vehicle body 12 or on the roof and walls, as convenient and desired.

Referring to FIGS. 8 and 9, a pendulum-actuated electrical switch structure 49 particularly suited for providing automatic leveling action in a system in accordance with this invention is shown. The switch comprises a base 50 which may be of any suitable material, such as metal or plastic, for example, a tubular body 51 of insulating material, and a cap 52 of insulating material. One end of the tubular insulating body 51 is sealed to the base 50, as by means of a resilient O-ring 53, for example, and the cap 52 is fitted into the other end of the tubular insulating body 51. The switch 49 is adapted to be mounted with the longitudinal axis of the tubular insulating body 51 in a vertical position. A pendulum member 54 is suspended within the tubular insulating body 51 from the cap 52, preferably along such longitudinal axis. The pendulum member 54 comprises a heavy mass having a circular electrically conductive surface on the exterior thereof and is suspended from the cap 52 in a manner to enable the mass to swing in any direction. For example, the mass 54 may conveniently comprise a solid metallic cylinder suspended within the tubular insulating body 51 by means of an electrically conductive wire 55 extending between one of its ends and the cap 52. The wire 55 may extend through the cap 52 and is mounted therein by an appropriate insert 56 so that electrical connections may be made to the mass 54. A plurality of metallic electrical contact members 61, 62, 63, and 64 are insulatingly mounted on the base 53 within the tubular insulating member 51 and spaced from each other about the periphery of the mass 54. As shown in FIG. 9, each of the contact members 61–64 provide an arcuate surface adjacent the electrically conducting exterior surface of the mass 54. The contacts are arranged with respect to each other such that the arcuate surfaces each form an arc of a common circle which is concentric with the circular electrically conducting surface on the exterior of the mass 54 and which has a diameter slightly larger than the diameter of the circular electrically conducting surface on the mass 54. The contact members 61–64 may be conveniently mounted on the base 53 by means of a dielectric ring 57, for example, which is appropriately bonded to the base 53. A plurality of electrically conductive rods 65, 66, 67, and 68, each associated with a different one of the contact members 61–64, extend through the insulating cap 52 and into electrical connection with the contact members 61–64 associated therewith. In addition to providing means for making an electrical connection between elements of the system and the contact members 61–64, the conductive rods 65–68 are mechanically attached to the base 50 and may each have a nut 59 threaded thereon in contact with the insulating cap 52. By selective adjustment of the nut 59 associated with each of the rods 65–68, the longitudinal axis of the tubular body 51 may be adjusted with respect to the base 50 by varying the amount of compression on the resilient O-ring 53 at various points about its periphery. Thus, it will be seen that the relationship between the circular electrically conductive surface on the exterior of the mass 54 and the circle formed by the arcuate inner surfaces of the contact members 61–64 may be adjusted by adjusting the longitudinal axis of the tubular body 51 with respect to the base 50.

It will be seen that if the base 50 of the switch 49 is mounted on a flat surface of the vehicle body 12 which it is desired to level, then the longitudinal axis of the body 51 is, or can be easily adjusted to be, perpendicular to such flat surface. If the flat surface is not level, then the mass 54 of the pendulum will swing into contact with one of the electrical contact means 61–64, establishing an electrical connection between the electrically conductive surface on the exterior of the mass 54 and the electrically conductive inner surface of the contact means 61–64. In fact, it is possible for the electrically conductive exterior surface of the mass 54 to contact any two adjacent ones of the contact means 61–64 due to the spacing between such contact members. It will be understood that ordinarily the circular exterior surface of the mass 54 would swing into contact with the circular inner surface of a contact member at a single point. However, where such single point of contact between the circular exterior surface of the mass 54 and the circle of which the interior surface of the contact members 61–64 are apart would occur at the space between adjacent contact members, then two points of contact will result, one between each of the adjacent contact members and the circular exterior surface of the mass 54. It has been found that the amount of spacing between the contact members 61–64 in order to provide the desired two-point contact under these conditions is not critical. Similarly, it has been found that the relative diameter of the circular exterior surface of the mass 54 and the circle of which the interior surfaces of the contact members 61–64 are a part is not critical in this regard. However, such relative diameter does determine the precision with which leveling may be obtained through the use of the switch 49. It will be understood that the greatest precision in leveling will be obtained where the difference between such diameters is made as small as is practical.

Referring to FIG. 2, it will be seen that, in the preferred embodiment of the system in accordance with this invention, four jack means 20 are used and the switch 49 is provided with four contact members 61–64, each adapted to electrically actuate a different one of the jacks 20, as indicated by the arrows. According to this embodiment of the invention, the jacks 20 are located at the corners of the body 12 of the vehicle, and each of the contact members 61–64 has a circular inner surface forming an arc of substantially 90° of the circle of which they each form a part. The switch 49 is positioned so that opposite spaces between the contact members lie on the lines parallel to the longitudinal and transverse axes, respectively, of the vehicle. As will be more fully explained hereinafter, the switch 49 is connected into the electrical control circuitry of the system such that when the mass 54 thereof swings into contact with one of the contact members 61–64, it will actuate the jack 20 associated therewith, causing the jack to elevate its associated corner of the vehicle body 12. Thus, if the rear of the vehicle body 12 is lower than the forward part thereof, the mass 54 will tend to swing into contact with that contact member, 61, for example, corresponding to the lowest rear corner, thereby actuating the jack located at such corner. As the jack extends, raising the associated corner of the vehicle, the mass 54 will tend to roll or slide along the circular inner surface of the contact member 61 until it reaches the space between the contact member 61 and the contact member 62.

The mass 54 will then make electrical contact with both contact members 61 and 62, actuating both jacks simultaneously and raising the rear of the vehicle until it is level with the forward portion of the vehicle, at which point the mass 54 will swing away from both contact members simultaneously.

As shown in FIG. 8, the tubular body 51 may be filled with an insulating oil 60. Such insulating oil will tend to damp any tendency of the mass 54 to oscillate or swing back and forth between contact members in operation. Such insulating oil will also inhibit any arcs that might tend to form in air between the mass 54 and a contact member due to the close spacing and electrical potential difference therebetween.

Referring to FIG. 3, it will be seen that the system of this invention may utilize a single pair of jacks 20, one located on each side of the longitudinal axis of the vehicle and rearwardly of the transverse axis thereof. In this embodiment of the invention, the switch 49' would include but two contact members 61 and 62, and the spacing therebetween would lie on a line parallel to such longitudinal axis. As pointed out hereinabove, the jack means 18 associated with the tongue 17 of the vehicle would be used to raise the front of the vehicle body 12 above the rear portion thereof. This would cause mass 54 to swing into contact with one or both of the contact members 61–62 as described above, actuating the jacks 20 to raise the rear of the vehicle body 12 to a level position of the vehicle body 12. As described in connection with the embodiment shown in FIG. 2, the inner surfaces of the contact members 61–62 form 90° arcs of a circle. It will be understood that according to the embodiment shown in solid lines in FIG. 3, automatic leveling of the vehicle body 12 can only occur where the rear of such body 12 is lower than its forward portion. This system could be modified to provide fully automatic leveling by the addition of a single further jack 20, located on the longitudinal axis, as indicated in dotted lines, in which case a third electrical contact member would be included in the switch 49', which third electrical contact member would be provided with an inner surface forming substantially 180° of the circle of which the inner surfaces of contact members 61 and 62 are a part. The third contact member would be spaced from contact members 61–62 with such spaces lying on a line parallel with the transverse axis of the vehicle body 12. However, such three-jack system would not be as stable as the embodiment shown in FIG. 2 and would be more expensive than the embodiment shown in solid lines in FIG. 3 and therefore is not favored in accordance with the teaching of this invention.

Referring to FIG. 10, the preferred embodiment of the system in accordance with the teaching of this invention, including the electrical and hydraulic circuitry, is shown schematically. For ease of understanding, reference numerals of the other drawings of this application have been used wherever possible in FIG. 10 to indicate corresponding elements of the system. As shown in FIG. 10, the system includes a first jack unit comprising a pair of scissors jacks 20a and 20b mounted at opposite ends of tubular metallic beam 22a and a second jack unit comprising a pair of scissors jacks 20c and 20d mounted at opposite ends of tubular metallic beam 22b. Each of the scissors jacks 20a–20d is operated by a different one of double-acting hydraulic rams 21a–21d. As indicated by dotted lines, the hydraulic rams 21a and 21b are mounted within tubular metallic beam member 22a, and hydraulic rams 21c and 21d are mounted within tubular metallic beam 22b. Each of the hydraulic rams 21a–21d is connected to the fluid pump 40 and reservoir 41 through a different one of four-way valves 42a–42b. According to the preferred embodiment of this invention, such four-way valves are normally closed, providing a seal between opposite sides of the piston of the hydraulic ram associated therewith and between such ram and the pump 40 and reservoir 41. Each of the four-way valves 42a–42 includes a first solenoid 43a–43d which, when properly energized by connection across an appropriate source of electrical energy such as batter 45, will cause the mechanism of its associated four-way valve to connect the opposite sides of the piston of the associated hydraulic ram to the pump 40 and reservoir 41 in such a way as to cause the piston rod 36 thereof to be retracted into the cylinder, thereby raising the associated jack 20a–20d. A second solenoid 44a–44d associated with each of the four-way valves 42a–42d when connected across battery 45 will cause the mechanism of the four-way valve associated therewith to connect opposite sides of the piston of the associated hydraulic ram to the pump 40 and reservoir 41 in such a way as to cause the piston rod 36 to extend from the cylinder thereof, thereby extending the associated jack 20a–20d. The electrical control system of the preferred embodiment of the system in accordance with the teaching of this invention includes a triple-throw, double-pole switch 46 and a triple-throw, three-pole switch 47 as well as a solenoid actuated motor control switch 48 and the pendulum actuated level control switch 49, as described hereinabove. Switches 46 and 47 are spring loaded to cause them to normally assume a position in which the movable switch contact thereof rests on a contact which is unconnected to any other element of the system. Thus, switches 46 and 47 are "normally open" switches. The movable contacts of both switches are directly connected to one side of the battery 45. The other side of the battery 45 is connected to one side of the motor 40, to one side of solenoids 43a–43d, to one side of solenoids 44a–44, and to one side of the solenoid of the solenoid-actuated motor control switch 48. Two of the contacts of one wafer of switch 46 and two of the contacts of one wafer of switch 47 are electrically connected to the opposite side of the solenoid of the solenoid-actuated motor control switch 48 from the battery 45. Thus, if the movable contact of either switch 46 or switch 47 is thrown to a contact other than the one on which it normally rests, the solenoid-actuated motor control switch 48 will be energized causing the pump 40 to be connected across the battery 45, thereby pumping hydraulic fluid from the reservoir 41 and providing pressurized fluid for the operation of the hydraulic rams 21a–21d under the control of four-way valves 42a–42d.

One contact of the other wafer of switch 46 is connected to the other side of solenoids 43a–43d from the battery so that when the movable contact of such wafer is thrown to this contact, each of the solenoids 43a–43d will be connected across the battery 45, thereby actuating the four-way valves 42a–42d in such a way as to cause the jacks 20a–20d to be retracted. The other contact of this wafer of switch 46 is connected to the circular electrically conductive surface of the pendulum mass 54 of leveling switch 49 through the wire 55. It will be seen that contact members 61–64 are connected to the opposite sides of solenoids 44a–44d, respectively, from the battery 45 through the conductive rods 65–68, respectively. Thus, if the movable contact of this wafer of switch 46 is thrown to this contact, the leveling switch 49 is connected into the circuit and is capable of actuating any one of the four-way valves 42a–42d or any two adjacent ones of such valves by engagement between the circular conductive surface on the mass 54 and the appropriate contact member or members 61–64 under the influence of gravity. Since the movable contacts of switch 46 are ganged together, as indicated by the dotted line, the pump 40 will be actuated whenever the switch 46 is thrown to a contact other than the normally open contact.

Similarly, two of the contacts of the switch 47 are connected to the opposite side of the solenoid of the solenoid-operated motor control switch 48 from the battery, and the movable contacts of all three wafers of the switch 47 are ganged together, as indicated by the dotted line, so that the pump 40 will be actuated when the switch 47 is thrown to a contact other than the normally open contact. One contact of the second wafer of switch 47 is connected to the opposite side of solenoid 44a from the battery 45, and the corresponding contact of the third wafer of switch 47 is connected to the opposite side of solenoid 44d from the battery 45. Similarly, the other contact of the second wafer of switch 47 is connected to the opposite side of solenoid 44b from the battery 45, and the corresponding contact of the third wafer of switch 47 is connected to the opposite side of solenoid 44c from the battery 45. Thus, when the movable contact of switch 47 is thrown to one of the contacts other than the normally open contact, jacks 20a and 20d will be extended by actuation of four-way valves 42a and 42d, which will simultaneously connect the rams 21a and 21d to the pump 40 and reservoir 41. When the movable contact of switch 47 is thrown to the second contact other than the normally open contact, solenoids 44b and 44c will be connected across battery 45, actuating four-way valves 42b and 42c to connect rams 21b and 21c to pump 40 and reservoir 41 in such a way as to extend jacks 20b and 20c. Since, according to the preferred embodiment of this invention, the beams 22a and 22b of the jack units are mounted with their longitudinal axes parallel to the transverse axis of the vehicle, operation of switch 47 as described above will enable either side of the vehicle to be raised independently of the other so that the wheels and tires may be serviced. It will be understood that switch 47 could be adapted to actuate all four jacks 20a–20d simultaneously, in which case the switch 47 could be replaced by a double-throw, double-pole switch. However, it is believed that the added feature of enabling servicing of the wheels and tires of the vehicle on which the system is used is of sufficient value to justify the relatively small additional expense of enabling jacks 20a and 20d to be operated independently of jacks 20b and 20c to raise the side of the vehicle associated therewith. It will be understood that an appropriate check valve could be used, one with each of four-way valves 42a–42d, in order to avoid the tendency of the jacks 20a–20d to slump over a period of time due to the leakage of hydraulic fluid from one side of the piston to the other of the rams 21a–21d through the associated four-way valves 42a–42d.

In accordance with the teaching of this invention, the primary purpose of switch 47 is to provide stabilization of the vehicle, and the primary purpose of switch 46 is to provide leveling of the vehicle. Thus, when the vehicle is stationary and it is desired to level the vehicle and stabilize it in its level position, switches 46 and 47 are both utilized. Ordinarily switch 47 would be utilized first and, in accordance with the preferred embodiment, the jacks 20a and 20d on one side of the vehicle would be lowered into engagement with the underlying terrain by manual operation of the switch 47, appropriate engagement and force equalization between the jacks 20a and 20d being indicated when a slight lifting of the corresponding side of the vehicle is detected. The switch 47 is then manually operated to lower the other two jacks 20b and 20c into engagement with the underlying terrain, and again appropriate engagement and force equalization is detected by a slight lifting of the associated side of the vehicle, at which time the switch 47 is allowed to return to its normally open position. The switch 46 is then manually operated to connect the leveling switch 49 into the control circuit. The switch 49 will operate as described hereinabove to level the vehicle. The completion of the leveling operation will be indicated when further movement of the vehicle ceases, and the switch 46 will then be allowed to return to its normally open position. At this point, switch 47 may be manually switched to each of its positions other than the normally open position momentarily in order to insure force equalization among the jacks 20a–20d of the system. It will of course be understood that switch 46 could be operated first to provide leveling through the engagement of one and possibly two of the jacks 20a–20d with the underlying terrain. Switch 47 would then be operated in order to bring the remaining jacks into engagement with the underlying terrain and to obtain the desired force equalization among the jacks 20a–20d.

Thus, it will be seen that the vehicle stabilization and control system in accordance with the teaching of this invention enables automatic leveling and stabilization of a vehicle by remote control. Such system in its preferred embodiment is also adapted to enable portions of the vehicle to be raised with respect to the underlying terrain in order to provide for the maintenance of the vehicle. The system may be easily mounted on any existing vehicle with minimum sacrifice of usable space and maximum flexibility in physical location of the elements of the system. It will be understood that the pendulum-actuated level control switch 49 may be mounted in any suitable location on the vehicle so long as it is mounted with proper orientation with respect to the longitudinal and transverse axes of the vehicle. Similarly, the electrical and hydraulic elements of the system may be physically located as desired and interconnected with other elements of the system through electrical wiring and hydraulic conduits.

Double acting hydraulic rams are used in the preferred embodiment described hereinabove in order to provide positive hydraulic retraction of the jack means. However, this is not essential to my invention, and single acting hydraulic rams may be used with spring means to return the jacks to their retracted position upon release of the hydraulic pressure. Although it is possible that the jacks may occasionally offer sufficient resistance to retraction to overcome the spring force (i.e., "stick") the hydraulic system would be simplified in that two-way valves would be used in place of four-way valves. The spring means may conveniently comprise helical tension springs each disposed about a ram and connected at one end to the beam member 21 and at the other end to the pin 26 or bearing member 26a so that the spring is placed in tension when the associated jack means is lowered hydraulically by connecting pressurized fluid from the pump 40 to the ram through the two-way valve. When the two-way valve returns to its normal position, it will disconnect the ram from the pump 40 and maintain the ram in its extended position. Actuation of the two-way valve in its opposite sense will connect the ram to the reservoir 41, allowing the spring tension to drive the hydraulic fluid from the ram and retract the jack means.

It will be understood that the only change required in the electrical control circuit where solenoid actuated two-way valves and single acting rams with spring return are used in the system is to omit the electrical actuation of the pump 40 during retraction of the jack means.

Other embodiments of my invention will be obvious to those skilled in the art.

What is claimed is:

1. In a system for stabilizing and leveling a stationary vehicle having a longitudinal axis and a transverse axis; a source of pressurized fluid mounted on said vehicle; a first hydraulic jack means mounted on said vehicle and adapted to be lowered into engagement with the underlying terrain hydraulically connected to said source of pressurized fluid through a first electrically actuated valve; a second hydraulic jack means mounted on said vehicle and adapted to be lowered into engagement with the underlying terrain hydraulically connected to said source of pressurized fluid through a second electrically actuated valve; said first and second jack means being mounted on opposite sides of one of said axes of said vehicle and on the same side of the other of said axes of said vehicle; and electrical control circuitry comprising first normally open manual switch means for simultaneously actuating both of said valves to lower both of said jack means into engagement with the underlying terrain; second normally open manual switch means for simultaneously actuating both of said valves to raise both of said jack means; automatic means for actuating each of said valves individually and both of said valves simultaneously to lower said jack means; and third normally open manual switch means for actuating said automatic means.

2. In a system as claimed in claim 1, third and fourth hydraulic jack means mounted on said vehicle and adapted to be lowered into contact with the underlying terrain hydraulically connected to said source of pressurized fluid through third and fourth electrically actuated valves, respectively; said third and fourth jack means being mounted on opposite sides of said one of said axes of said vehicle from each other and on the opposite side of said other of said axes of said vehicle from said first and second jack means; said first normally open manual switch means being adapted to simultaneously actuate said third and fourth valves to lower said third and fourth jack means into engagement with the underlying terrain independently of said first and second jack means; said second normally open manual switch means being adapted to actuate said third and fourth valves simultaneously with said first and second valves to simultaneously raise all of said jack means; and said automatic means being adapted to actuate any one of said valves independently and any two adjacent valves simultaneously to lower said jack means associated therewith.

3. The system as claimed in claim 1 wherein said first and second jack means are mounted on opposite sides of said longitudinal axis of said vehicle and on the same side of said transverse axis of said vehicle.

4. The system as claimed in claim 2 wherein said first and second jack means are mounted on opposite sides of said transverse axis of said vehicle on one side of the longitudinal axis thereof and said third and fourth jack means are mounted on opposite sides of said transverse axis of said vehicle on the other side of the longitudinal axis thereof.

5. The system as claimed in claim 4 wherein said jack means are located with respect to each other such that lines drawn therebetween in numerical order form a rectangle.

6. The system as claimed in claim 1 wherein said first and second hydraulic jack means each comprise a scissors jack structure actuated by a hydraulic ram and wherein said first and second jack means are mounted at opposite ends of a tubular metallic beam member with said hydraulic rams housed within said beam member.

7. The system as claimed in claim 1 wherein said automatic means includes a pendulum actuated electrical switch comprising a pendulum member having an external circular electrical contact surface of given diameter thereon, a pair of spaced electrical contact members insulated from each other and having coplanar concave conducting surfaces defining equal portions of an arc of substantially 180° of a circle having a diameter slightly larger than said given diameter, means suspending said pendulum member with said circular electrical contact surface thereon in the plane of said conducting surfaces of said contact members from a point concentric with said circle, said pendulum actuated switch being oriented such that the diameter of said circle passing through the ends of said 180° arc of said circle formed by said conducting surfaces of said contact members is perpendicular to said one axis of said vehicle, the space between adjacent ends of said conducting surfaces on said contact members is centered on a radius of said circle which is parallel to said one axis of said vehicle, and the plane in which said conducting surfaces of said contact members are coplanar is parallel to a selected generally horizontal surface of said vehicle to be leveled.

8. A jack unit comprising a tubular metallic beam; a pair of hydraulic rams having their cylinders rigidly mounted within said tubular metallic beam co-axially thereof, the piston rod of each of said rams being adapted to project from the cylinder thereof along the axis of said tubular metallic beam and toward a different end thereof, said beam having a pair of opposed slots through the wall thereof at each end; a pair of scissors jacks each mounted at a different end of said beam, said scissors jacks each comprising a first pair of lever arms pivoted about a first pin fixedly mounted in the associated end of such beam, and a second pair of lever arms pivoted about a pin received in said pair of opposed slots at the associated end of said beam, said piston rod of each of said rams being mechanically connected to the one of said second pins at the end of said beam toward which said piston rod projects and each of said lever arms of said first pair of lever arms being pivotally connected to a different one of said second pair of lever arms.

* * * * *